(12) United States Patent
Farlow

(10) Patent No.: US 8,453,777 B2
(45) Date of Patent: Jun. 4, 2013

(54) COOLING FAN DUCT ASSEMBLY

(75) Inventor: Scott K. Farlow, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 52 days.

(21) Appl. No.: 13/279,374

(22) Filed: Oct. 24, 2011

(65) Prior Publication Data

US 2013/0098578 A1 Apr. 25, 2013

(51) Int. Cl.
*B60K 11/00* (2006.01)
(52) U.S. Cl.
USPC ........................................................ 180/68.1
(58) Field of Classification Search
USPC ........... 180/68.1, 68.3, 68.4, 68.6; 123/41.01, 123/41.71, 41.65; 165/41, 51, 122
See application file for complete search history.

(56) References Cited

U.S. PATENT DOCUMENTS

| | | | | |
|---|---|---|---|---|
| 2,346,178 A * | 4/1944 | Mercier | ........................ | 165/123 |
| 3,238,999 A * | 3/1966 | Nallinger | ........................ | 165/41 |
| 3,791,482 A * | 2/1974 | Sykora | ........................ | 181/229 |
| 4,059,080 A * | 11/1977 | Rudert | ........................ | 123/41.33 |
| 4,249,626 A * | 2/1981 | Fields et al. | ................ | 180/68.1 |
| 4,354,458 A * | 10/1982 | Bury | ........................ | 123/184.38 |
| 4,757,858 A * | 7/1988 | Miller et al. | .................... | 165/41 |
| 4,840,221 A * | 6/1989 | Dumas et al. | ................... | 165/41 |
| 4,938,303 A | 7/1990 | Schaal et al. | | |
| 4,979,584 A * | 12/1990 | Charles | ........................ | 180/68.1 |
| 5,129,473 A * | 7/1992 | Boyer | ........................ | 180/68.1 |
| 5,193,636 A * | 3/1993 | Holm | ........................ | 180/68.1 |
| 5,490,573 A * | 2/1996 | Hagiwara et al. | ............ | 180/68.1 |
| 5,495,909 A * | 3/1996 | Charles | ........................ | 180/68.1 |
| 5,678,648 A * | 10/1997 | Imanishi et al. | ............. | 180/68.1 |
| 5,704,643 A * | 1/1998 | Yamanaka et al. | ............ | 280/781 |
| 6,142,213 A * | 11/2000 | Gallivan et al. | .................. | 165/41 |
| 6,257,359 B1 * | 7/2001 | Granlund et al. | ............ | 180/68.1 |
| 6,401,801 B1 * | 6/2002 | Dicke | ........................ | 165/51 |
| 6,435,144 B1 * | 8/2002 | Dicke et al. | ................ | 123/41.12 |
| 6,435,264 B1 * | 8/2002 | Konno et al. | .................... | 165/41 |
| 6,443,253 B1 * | 9/2002 | Whitehead et al. | .......... | 180/68.1 |
| 6,634,448 B2 * | 10/2003 | Bland | ........................ | 180/68.1 |
| 6,892,842 B2 * | 5/2005 | Bouffard et al. | ............. | 180/68.3 |
| 6,945,576 B1 * | 9/2005 | Arentzen | ...................... | 293/117 |
| 7,040,260 B2 * | 5/2006 | Yoshimatsu et al. | ........ | 123/41.65 |
| 7,051,786 B2 * | 5/2006 | Vuk | ........................ | 165/41 |
| 7,080,704 B1 * | 7/2006 | Kerner et al. | ................ | 180/68.1 |
| 7,089,994 B2 * | 8/2006 | Esposito et al. | ................ | 165/42 |
| 7,096,925 B2 * | 8/2006 | Bracciano | ........................ | 165/42 |
| 7,128,178 B1 * | 10/2006 | Heinle et al. | ................ | 180/68.4 |
| 7,134,518 B2 * | 11/2006 | Arai et al. | .................... | 180/68.1 |
| 7,325,518 B2 * | 2/2008 | Bering | ........................ | 123/41.01 |
| 7,353,899 B2 * | 4/2008 | Abe et al. | ...................... | 180/68.3 |
| 7,358,003 B2 * | 4/2008 | Imaseki et al. | ................ | 429/435 |
| 7,370,718 B2 * | 5/2008 | Witwer et al. | ................ | 180/69.2 |
| 7,383,905 B2 * | 6/2008 | Lang et al. | .................... | 180/68.1 |

(Continued)

*Primary Examiner* — John R Olszewski
*Assistant Examiner* — Brodie Follman

(57) ABSTRACT

A fan duct assembly is provided for a vehicle having an engine-driven main cooling fan. The fan duct assembly includes a hollow housing and a pair of duct members which communicate with the housing and extend from the housing and laterally in side directions. An auxiliary cooling unit is received in the housing. A pair of auxiliary fans is received in the housing. Each fan is positioned between the auxiliary cooling unit and a respective one of the duet members. The hollow housing and the duct members are positioned in front of the main cooling fan. The hollow housing is positioned above a fan drive for driving the main cooling fan. Each of the fans draws air from a different direction.

11 Claims, 4 Drawing Sheets

U.S. PATENT DOCUMENTS

| | | | |
|---|---|---|---|
| 7,426,909 B2* | 9/2008 | Keane et al. | 123/41.29 |
| 7,523,798 B2* | 4/2009 | Muramatsu et al. | 180/68.1 |
| 7,537,072 B2* | 5/2009 | Sturmon et al. | 180/68.1 |
| 8,104,559 B2* | 1/2012 | Kisse | 180/68.1 |
| 8,256,551 B2* | 9/2012 | Entriken et al. | 180/68.1 |
| 8,262,443 B2* | 9/2012 | Butera et al. | 454/75 |
| 2003/0015361 A1* | 1/2003 | Bland | 180/68.1 |
| 2003/0155107 A1* | 8/2003 | Bianco | 165/124 |
| 2004/0045754 A1* | 3/2004 | Bland | 180/68.1 |
| 2004/0144521 A1* | 7/2004 | Farag | 165/42 |
| 2004/0173395 A1* | 9/2004 | Arai et al. | 180/68.1 |
| 2004/0226683 A1* | 11/2004 | Esposito et al. | 165/41 |
| 2005/0006048 A1* | 1/2005 | Vuk | 165/41 |
| 2005/0081803 A1* | 4/2005 | Yoshimatsu et al. | 123/41.65 |
| 2007/0051326 A1* | 3/2007 | Bering | 123/41.71 |
| 2008/0142285 A1* | 6/2008 | McCurdy et al. | 180/68.1 |
| 2008/0251039 A1* | 10/2008 | Stone et al. | 123/41.48 |
| 2010/0071870 A1* | 3/2010 | Kisse | 165/51 |
| 2010/0116229 A1* | 5/2010 | Kojima | 123/41.49 |
| 2010/0155013 A1* | 6/2010 | Braun et al. | 165/41 |
| 2010/0294580 A1* | 11/2010 | Kubota et al. | 180/68.1 |
| 2011/0155081 A1* | 6/2011 | Entriken et al. | 123/41.49 |
| 2012/0055170 A1* | 3/2012 | Lilke | 62/3.3 |
| 2012/0308373 A1* | 12/2012 | Farlow et al. | 415/208.1 |
| 2012/0318476 A1* | 12/2012 | Begleiter et al. | 165/51 |

* cited by examiner

COOLING FAN DUCT ASSEMBLY

FIELD OF THE INVENTION

The present invention relates to a cooling fan duct assembly.

BACKGROUND OF THE INVENTION

A vehicle with an internal combustion engine includes a main cooling system which includes a radiator fan and a radiator. Such a vehicle may also include an auxiliary cooling unit, such as a hot oil cooler (HOC) which may be mounted externally with respect to the main cooling system. The air which flows through HOC may be driven by two small electric motor-driven auxiliary fans, while the radiator fan may be a single large engine-driven fan. It would be desirable to prevent interaction between the auxiliary fans and main radiator fan, in order to improve or maximize the efficiency of the auxiliary fans. It would also be desirable to have the auxiliary fans and main radiator fan draw air from different directions, so that any blockage that reduces air flow to one of the fans, does not reduce air flow to the other fans.

SUMMARY OF THE INVENTION

Accordingly, an object of this invention is to provide a cooling fan duct assembly which reduces interaction between the auxiliary fans and main radiator fan.

Another object of this invention is to provide a cooling fan duct assembly which draws air from a direction different from the direction from which the main radiator fan draws air.

These and other objects are achieved by the present invention, wherein a fan duct assembly is mounted in front of the main cooling or radiator fan of the main cooling system for a vehicle engine. The fan duct assembly includes a hollow housing which receives an auxiliary cooling unit. A first duct member communicates with the housing and extends from the housing away from the cooling unit and laterally in a first side direction. A second duct member communicates with the housing and extends from the housing away from the cooling unit and laterally in a second side direction. A pair of fans are received in the housing. Each fan is positioned between the cooling unit and a respective one of the duct members. The first duct member forms a first opening which faces in the first side direction, and the second duct member forms a second opening which faces in the second side direction.

DESCRIPTION OF THE PREFERRED EMBODIMENT

Figure 1:
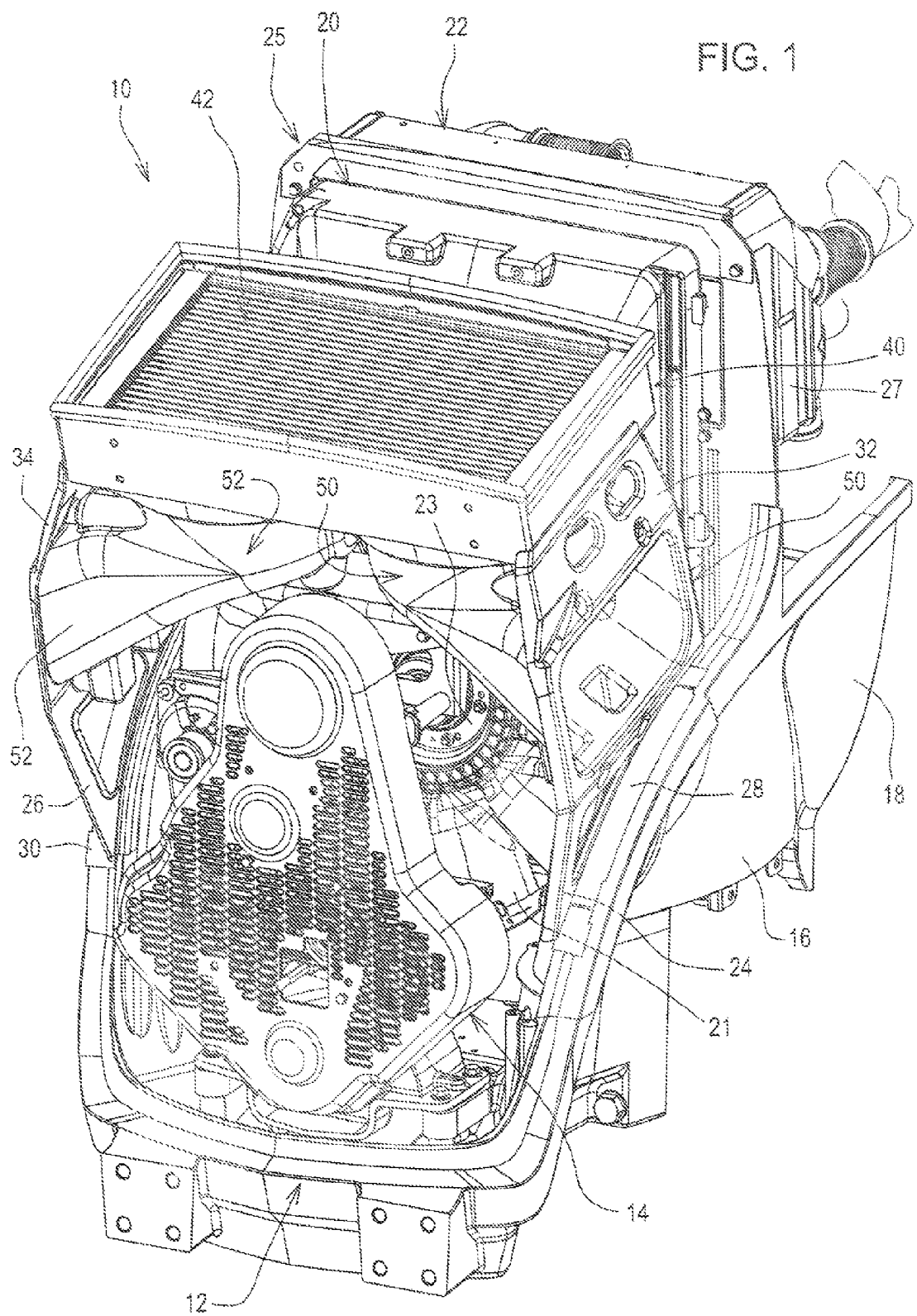
FIG. 1 is a left front perspective view of a cooling fan duct assembly mounted to engine components.

Referring to FIG. 1, a cooling fan duct assembly 10 is mounted adjacent to a plurality of vehicle engine components, including a front support 12, an auxiliary drive unit 14, fixed panels 16 and 18, a fan shroud 20, a cooling module 22 and a fan 21 and a fan drive 23. Cooling or radiator module 22 preferable includes a conventional radiator 25, charge air cooler 27, condenser (not shown) and fuel cooler (not shown). Left and right brackets 24 and 26, attach the lower left and right ends of the duct assembly 10 to corresponding left and right sides 28 and 30 of the front support 12.

Figure 2:
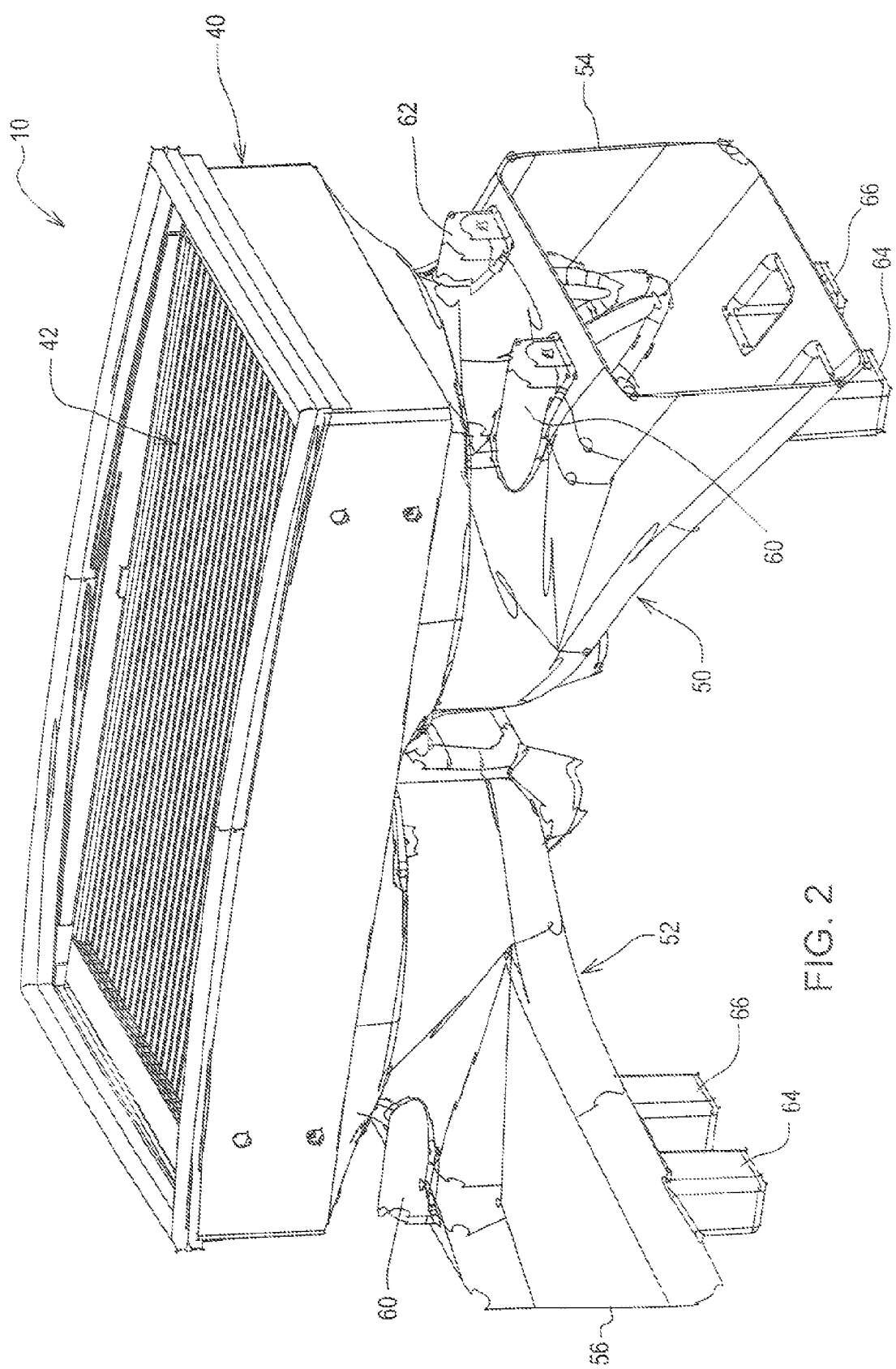
FIG. 2 is a perspective view of the cooling fan duct assembly of FIG. 1.
Figure 3:
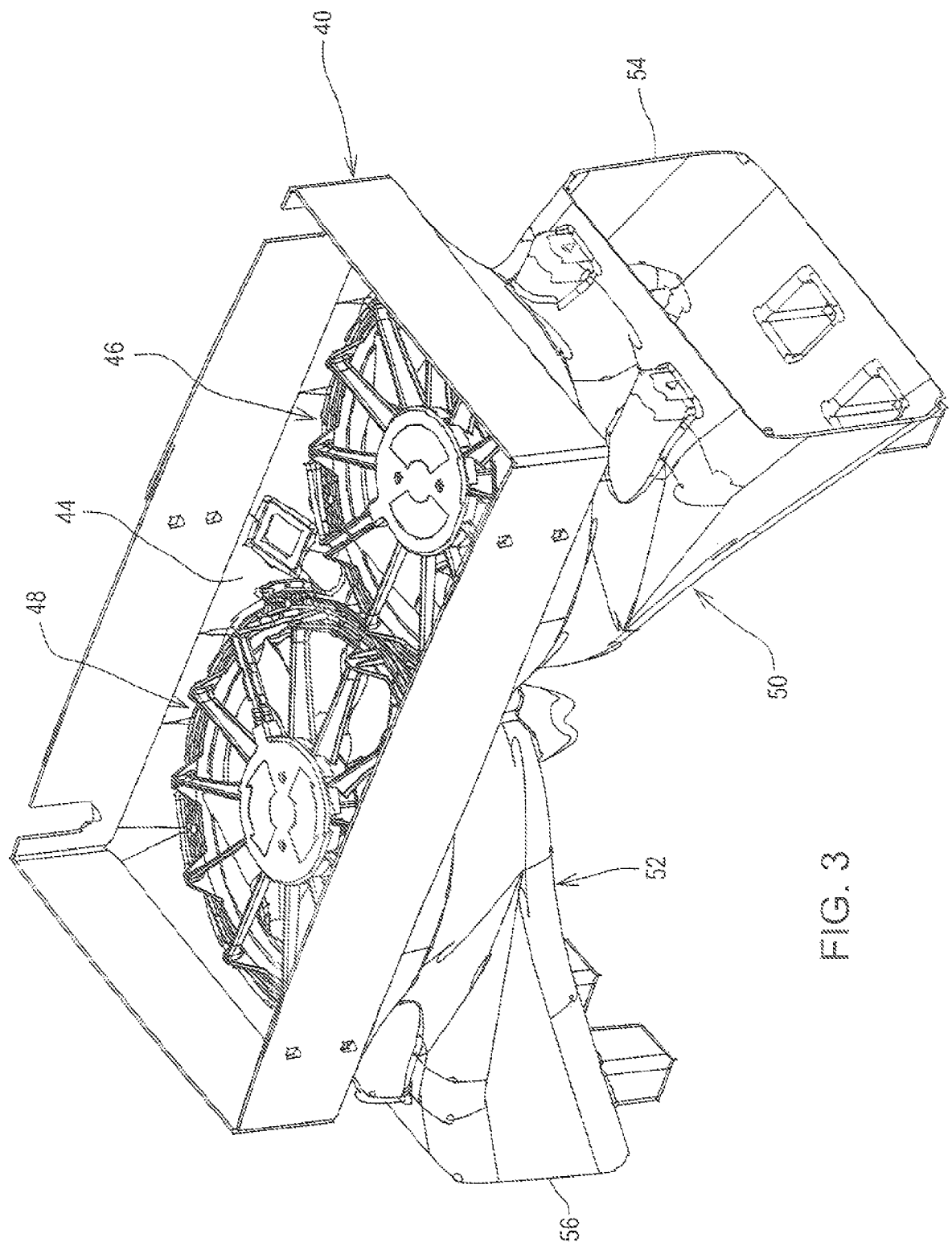
FIG. 3 is a perspective view of the cooling fan duct assembly of FIG. 2 with a top screen removed.
Figure 4:
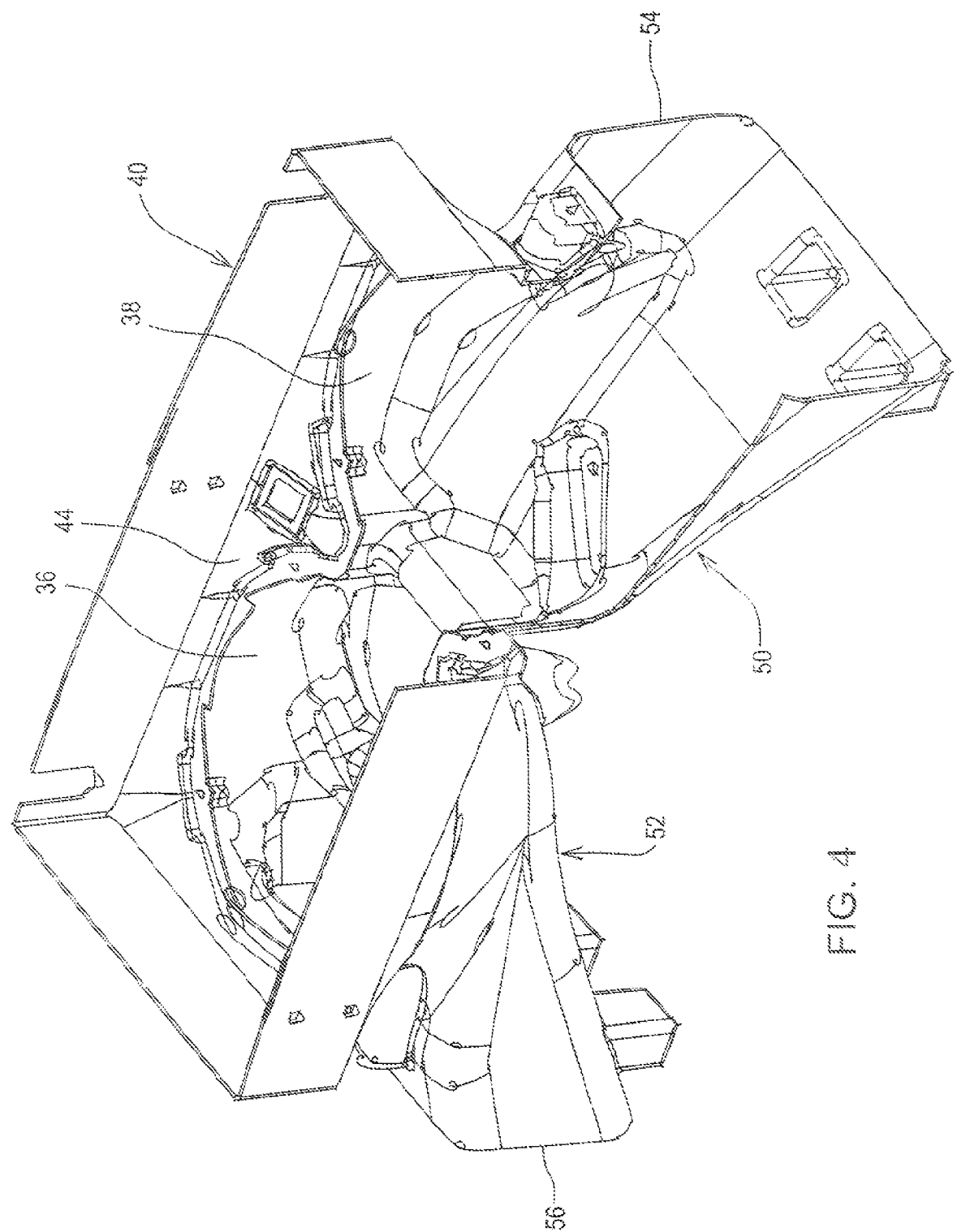
FIG. 4 is perspective partially sectional view of the cooling fan duct assembly of FIG. 3.

Referring now to FIGS. 2, 3 and 4, the duct assembly 10 includes a rectangular hollow housing 40 which receives an auxiliary cooling unit 42 such as a hydraulic oil cooler. A pair of openings 36 and 38 are formed in the bottom side 44 of housing 40. Each of the openings 36 and 38 receives a corresponding one of rotary auxiliary fans 46 and 48, and is connected to or communicated with a corresponding one of a pair of spate hollow duct members 50 and 52. Duct member 50 extends downwardly (away from the cooling unit 42) and to the left from the bottom side 44 of housing 40 and forms a leftward facing opening 54. Duct member 52 extends downwardly (away from the cooling unit 42) and to the right from the bottom side 44 of housing 40 and forms a rightward facing opening 56. Duct member 50 extends away from duct member 52, and duct member 52 extends away from duct member 50. The duct member 52 has an interior which is isolated from an interior of the duct member 50. Fans 46 and 48 draw air in from the openings 54 and 56 and force the air upwardly through the housing 40 and through the cooling unit 42. Fans 46 and 48 are preferably driven by electric motors (not shown).

Mounting bosses 60 and 62 are formed on the upper sides of the duct members 50 and 52. Mounting bosses 64 and 66 are formed on the lower sides of the duct members 50 and 52. These bosses provide mounting points for hardware (not shown) to mount outer hood guides (not shown). The hood guides (not shown) allow a hood (not shown) slide over the duct members 50 and 52 without catching on the hood as it opens and closes. Conventional screens or grills (not shown) would preferably cover the area in front of the fan 21, and would cover the duct openings 54 and 56 to screen out debris.

Referring again to FIG. 1, the cooling fan duct assembly 10 is mounted in front of the fan shroud 20 and the cooling module 22. A portion of the cooling fan duct assembly 10 is mounted in front of the main or radiator cooling fan 21 and above the fan drive 23 for fan 21. A portion of the cooling fan duct assembly 10 is mounted above and behind the auxiliary drive unit 14. Left and right support members 32 and 34, attach the lower left and right ends of the housing 40 to corresponding upper left and right edges of the duct members 50 and 52.

The separate duct members 50 and 52 prevent interaction between the main cooling fan 21 and the electric fans 46 and 48. In addition, this isolation prevents the main engine cooling fan 21 from requiring the electric fans 46 and 48 to run faster and becomes less efficient. The auxiliary fans 46 and 48 and main radiator fan 21 draw air from different directions, so that any blockage that reduces air flow to one of the fans, does not reduce air flow to the other fans. The duct assembly is preferably a one piece design that integrates significant function into one part. The advantages are improved fan efficiency with the ducts, the significant functional integration of the entire system, simplification of the design and fewer parts.

While the present invention has been described in conjunction with a specific embodiment, it is understood that many alternatives, modifications and variations will be apparent to those skilled in the art in light of the foregoing description. For example, the separate duct members could extend forward or in directions other than laterally. Accordingly, this invention is intended to embrace all such alternatives, modifications and variations which fall within the spirit and scope of the appended claims.

We claim:

1. In a vehicle having an engine-driven main cooling fan, a fan duct assembly comprising:
   a hollow housing;
   an auxiliary cooling unit received in the housing;
   a first duct member communicating with the housing and extending from the housing away from the auxiliary cooling unit in a first direction;
   a second duct member communicating with the housing and extending from the housing away from the auxiliary cooling unit in a second direction;
   a pair of fans received in the housing, each fan being positioned between the auxiliary cooling unit and a respective one of the duct members, the hollow housing and the first and second duct members being positioned in front of the main cooling fan.

2. The fan duct assembly of claim 1, wherein:
   the first duct member extends away from the second duct member; and
   the second duct member extends away from the first duct member.

3. The fan duct assembly of claim 1, wherein:
   the first duct member forms a first opening which faces in a first side direction; and
   the second duct member forms a second opening which faces in a second side direction.

4. The fan duct assembly of claim 1, wherein:
   the hollow housing is positioned above a fan drive for driving the main cooling fan.

5. The fan duct assembly of claim 1, further comprising:
   a front support having left and right side supports;
   a left bracket attaching a lower left end of the duct assembly to the left side support; and
   a right bracket attaching a lower right end of the duct assembly to the right side support.

6. The fan duct assembly of claim 1, wherein:
   each of the fans draws air from a different direction.

7. A vehicle engine cooling component assembly comprising:
   a radiator;
   a main radiator fan;
   a fan drive for driving the radiator fan; and
   a fan duct assembly mounted in front of the radiator fan, a portion of the fan duct assembly being positioned above the fan drive, the fan duct assembly comprising:
      a hollow housing;
      a cooling unit received in the housing;
      a first duct member communicating with the housing and extending from the housing away from the cooling unit and laterally in a first side direction, the first duct member being attached to the left side member;
      a second duct member communicating with the housing and extending from the housing away from the cooling unit and laterally in a second side direction, the second duct member being attached to the right side member; and
      a pair of fans received in the housing, each fan being positioned between the cooling unit and a respective one of the duct members.

8. The engine cooling component assembly of claim 7, wherein:
   the first duct member forms a first opening which faces in the first side direction; and
   the second duct member forms a second opening which faces in the second side direction.

9. The engine cooling component assembly of claim 7, further comprising:
   an auxiliary drive unit 14, and a portion of the fan duct assembly is positioned above the auxiliary drive unit.

10. The engine cooling component assembly of claim 7, wherein:
    each of the fans draws air from a different direction.

11. In a vehicle having an engine-driven main cooling fan, a fan duct assembly comprising:
    a hollow housing;
    an auxiliary cooling unit received in the housing;
    a first duct member communicating with the housing and extending from the housing and away from the auxiliary cooling unit;
    a second duct member communicating with the housing and extending from the housing and away from the auxiliary cooling unit, the second duct member having an interior which is isolated from an interior of the first duct member;
    a pair of fans received in the housing, each fan being positioned between the auxiliary cooling unit and a respective one of the duct members, the hollow housing and the first and second duct members being positioned in front of the main cooling fan.

* * * * *